US009092955B2

(12) United States Patent
Chung et al.

(10) Patent No.: US 9,092,955 B2
(45) Date of Patent: Jul. 28, 2015

(54) LASER APPARATUS CAPABLE OF CONTROLLING A PHOTO-MECHANICAL EFFECT AND METHOD USING THE SAME

(71) Applicant: Konkuk University Industrial Cooperation Corp, Seoul (KR)

(72) Inventors: Soon Cheol Chung, Chungju-si (KR); Jae Hoon Jun, Seoul (KR); Jong Rak Park, Gwangju (KR); Seungmoon Choi, Pohang-si (KR); Gu In Jung, Cheongwon-gun (KR); Byung Chan Min, Daejeon (KR); Hyung Sik Kim, Seoul (KR); Sung Phil Kim, Seongnam-si (KR)

(73) Assignee: KONKUK UNIVERSITY INDUSTRIAL COOPERATION CORP, Seoul (KR)

( * ) Notice: Subject to any disclaimer, the term of this patent is extended or adjusted under 35 U.S.C. 154(b) by 246 days.

(21) Appl. No.: 14/061,897

(22) Filed: Oct. 24, 2013

(65) Prior Publication Data

US 2014/0285328 A1 Sep. 25, 2014

(30) Foreign Application Priority Data

Mar. 22, 2013 (KR) ........................ 10-2013-0030726
Mar. 22, 2013 (KR) ........................ 10-2013-0030727

(51) Int. Cl.
*H04B 3/36* (2006.01)
*G08B 6/00* (2006.01)

(52) U.S. Cl.
CPC ........................................ *G08B 6/00* (2013.01)

(58) Field of Classification Search
CPC ... A61N 5/06; A61N 2005/067; A61B 18/20; A61B 2017/00154
USPC ......... 340/407.1, 512, 557; 372/25, 30; 606/2
See application file for complete search history.

(56) References Cited

U.S. PATENT DOCUMENTS

| | | | | |
|---|---|---|---|---|
| 5,682,447 | A * | 10/1997 | Kuzyk et al. | 385/13 |
| 6,050,990 | A * | 4/2000 | Tankovich et al. | 606/9 |
| 6,118,913 | A | 9/2000 | O'Connor et al. | |
| 2005/0197655 | A1 | 9/2005 | Telfair et al. | |
| 2006/0195072 | A1* | 8/2006 | Miller | 606/2 |
| 2008/0279232 | A1* | 11/2008 | Sung | 372/24 |
| 2012/0029394 | A1* | 2/2012 | Babaev | 601/2 |

* cited by examiner

*Primary Examiner* — Phung Nguyen
(74) *Attorney, Agent, or Firm* — LRK Patent Law Firm

(57) ABSTRACT

The present invention relates to a laser apparatus for inducing a photo-mechanical effect. More particularly, the present invention relates to a laser apparatus for outputting a pulsed laser beam and inducing a photo-mechanical effect by controlling pulse energy of the pulsed laser beam.

13 Claims, 12 Drawing Sheets

- Location 1 ≠ Location 2
- Output diameter 1 ≠ Output diameter 2
- D1 = D2

LASER APPARATUS CAPABLE OF CONTROLLING A PHOTO-MECHANICAL EFFECT AND METHOD USING THE SAME

CROSS REFERENCE TO RELATED APPLICATION

The present application claims the benefits of Korean Patent Applications No. 10-2013-0030726 and No. 10-2013-0030727 filed on Mar. 22, 2013, in the Korean Intellectual Property Office, the entire contents of which are incorporated herein by reference.

BACKGROUND OF THE INVENTION

1. Technical Field

The present invention relates to a laser apparatus capable of controlling a photo-mechanical effect and a method using the same and, more particularly, to a laser apparatus capable of generating a photo-mechanical effect using a pulse laser beam and of controlling the photo-mechanical effect by controlling pulse energy in the state in which the diameter of the pulsed laser beam is constantly maintained.

2. Description of the Related Art

A laser apparatus means an apparatus for emitting light using light amplification by stimulated emission of radiation.

Such a laser apparatus can emit 'artificial light having a uniform direction, phase, and wavelength' different from natural light, and the laser apparatus is used in many industry fields based on such a characteristic. More particularly, the laser apparatus is used in a variety of industry fields that cover 1) an optical communication field using optical characteristics, 2) medical fields, such as disease monitoring, low-level laser therapy, and photodynamic therapy, 3) a nano technology field for separating chemical bonds, and 4) a precision machining field, such as diamond processing.

However, the conventional laser apparatus is used only in terms of optical effects or in terms of photo-chemical or photo-thermal effects generated in a range of 80° C. or more.

Accordingly, there is no research on a laser apparatus capable of generating a photo-mechanical effect.

SUMMARY OF THE INVENTION

An object of the present invention is to induce a photo-mechanical effect using a laser apparatus.

Another object of the present invention is to propose a mechanical stimulus to the human body using a laser apparatus.

Yet another object of the present invention is to control a photo-mechanical effects induced by a laser apparatus.

A laser apparatus in accordance with an embodiment of the present invention outputs a pulsed laser beam and induces a photo-mechanical effect by controlling energy of the pulsed laser beam.

Furthermore, the laser apparatus in accordance with an embodiment of the present invention controls energy per pulse of the pulsed laser beam for inducing the photo-mechanical effect.

Furthermore, in the laser apparatus in accordance with an embodiment of the present invention, the energy per pulse is controlled to a value of 0.005 mJ or more.

Furthermore, in the laser apparatus in accordance with an embodiment of the present invention, the energy per pulse is controlled to a value ranging from 0.005 mJ to 9.5 mJ.

Furthermore, the laser apparatus in accordance with an embodiment of the present invention is used to apply a mechanical stimulus to the human body.

Furthermore, the laser apparatus in accordance with an embodiment of the present invention controls the energy per pulse by controlling power or a pulse width of laser output light.

Furthermore, in the laser apparatus in accordance with an embodiment of the present invention, the pulse width is controlled in a range of millisecond (ms) or lower.

Furthermore, the laser apparatus in accordance with an embodiment of the present invention controls the photo-mechanical effect by controlling the energy of the pulsed laser beam in the state in which a diameter of the pulsed laser beam is constantly maintained.

Furthermore, the laser apparatus in accordance with an embodiment of the present invention can be operable in a mode in which photo-mechanical force is increased and in a mode in which photo-mechanical force is reduced. The laser apparatus increases energy per pulse of the pulsed laser beam in the mode in which photo-mechanical force is increased and decreases energy per pulse of the pulsed laser beam in the mode in which photo-mechanical force is reduced.

Furthermore, the laser apparatus in accordance with an embodiment of the present invention can perform a first operation for constantly maintaining an output diameter of the pulsed laser beam and a second operation for changing an output diameter of the pulsed laser beam.

Furthermore, the laser apparatus in accordance with an embodiment of the present invention constantly maintains a diameter of the pulsed laser beam when the pulsed laser beam reaches a target.

Furthermore, the laser apparatus in accordance with an embodiment of the present invention constantly maintains a diameter of the pulsed laser beam when the pulsed laser beam reaches the target by changing an output diameter of the pulsed laser beam if a distance from the target is changed.

Furthermore, the laser apparatus in accordance with an embodiment of the present invention further includes a lens unit for changing an output diameter of the pulsed laser beam.

Furthermore, the laser apparatus in accordance with an embodiment of the present invention further includes a distance recognition unit for recognizing a distance from the target, wherein the lens unit is controlled based on distance information recognized by the distance recognition unit.

Furthermore, in the laser apparatus in accordance with an embodiment of the present invention, the distance recognition unit measures the distance using ultrasonic waves, infrared rays, or a laser.

Meanwhile, a haptic apparatus in accordance with an embodiment of the present invention can output a pulsed laser beam, generate a photo-mechanical effect by controlling energy of the pulsed laser beam, and propose a mechanical sense using the photo-mechanical effect. Furthermore, the haptic apparatus in accordance with an embodiment of the present invention controls the photo-mechanical effect by controlling the energy of the pulsed laser beam in a state in which the diameter of the pulsed laser beam is constantly maintained, and the haptic apparatus controls the mechanical sense by controlling the photo-mechanical effect.

Meanwhile, a method of inducing a photo-mechanical effect in accordance with an embodiment of the present invention includes (a) controlling, by a laser apparatus, energy of a pulsed laser beam, (b) radiating the pulsed laser beam generated from the laser apparatus to a target, and (c) inducing, by the pulsed laser beam radiated to the target, the photo-mechanical effect.

Furthermore, the method of inducing a photo-mechanical effect in accordance with an embodiment of the present invention control the photo-mechanical effect by controlling the energy of the pulsed laser beam in the state in which a diameter of the pulsed laser beam is constantly maintained.

DETAILED DESCRIPTION

Figure 1:
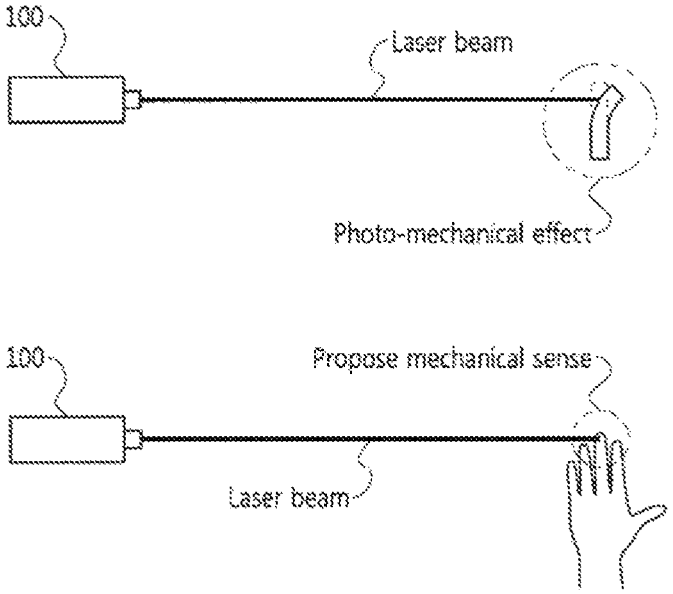
FIG. 1 is a diagram illustrating photo-mechanical effects that can be generated by a laser apparatus.

A laser apparatus and a method using the same in accordance with the present invention are described in detail with reference to the accompanying drawings. The illustrated embodiments are provided in order for those skilled in the art to readily understand the technical spirit of the present invention, and the present invention is not restricted by the embodiments. Furthermore, expressions in the accompanying drawings are diagramed in order to easily describe the embodiments of the present invention and may be different from forms actually implemented using drawings.

Each of elements expressed herein is only an example for implementing the present invention. Accordingly, in another implementation of the present invention, other elements may be used without departing from the spirit and range of the present invention. Furthermore, each element may be purely implemented using a hardware or software elements, but may be implemented using a combination of various hardware and software elements that perform the same function.

The characteristics of a laser apparatus in accordance with the present invention are roughly described below.

A laser apparatus in accordance with the present invention can induce photo-mechanical effects through a laser beam. More particularly, the laser apparatus can induce photo-mechanical effects by controlling parameters of a laser beam which are conventionally used to only induce a photo-chemical effect or a photo-thermal effect. Accordingly, the laser apparatus in accordance with the present invention can be used in a variety of industry fields that require a mechanical stimulus. In particular, the laser apparatus can also be used as the source of a mechanical sense even in somesthesis suggestion fields (e.g., a sense suggestion apparatus and a haptic apparatus) which have an entry barrier due to a problem (e.g., damage to a skin tissue) which may be induced by a photo-chemical effect or a photo-thermal effect.

A laser apparatus in accordance with the present invention generates a laser beam using a pulsed laser not using a Continuous Wave (CW) laser in order to generate a photo-mechanical effect and controls the energy of the generated pulsed laser beam.

If a laser stimulus is continuously provided, a photo-chemical effect or a photo-thermal effect can be generated. For this reason, a pulsed laser is used to obtain a photo-mechanical effect while minimizing the photo-chemical effect or the photo-thermal effect.

Furthermore, a laser apparatus in accordance with the present invention controls energy per pulse of a pulsed laser, and a photo-mechanical effect of the laser beam is induced through an operation of controlling the parameter.

If an exposure time and energy per pulse are controlled in a specific range, a plasma phenomenon and a shock wave phenomenon can be generated. A photo-mechanical effect generated based on the phenomena is not preferred because damage to the skin can be caused. Meanwhile, if energy per pulse is properly controlled to a small value, a photo-mechanical effect can be generated by a laser-induced elastic effect not by a plasma phenomenon and a shock waves phenomenon. In this case, damage to the skin is not caused. Accordingly, it is preferred that energy per pulse be limited within a range in which damage to the skin is not generated and a laser-induced elastic effect by the absorption of a laser be induced.

Furthermore, a laser apparatus in accordance with the present invention controls energy per pulse in a pulse width condition of millisecond (ms) or lower and generates a photo-mechanical effect by a laser beam based on the control operation.

In the case where a pulsed laser is used, if a pulse width is great, a photo-chemical or photo-thermal phenomenon can be generated because a sufficient exposure time for a laser stimulus is ensured. Accordingly, it is preferred that such a phenomenon be prevented by controlling energy per pulse in a pulse width condition of millisecond (ms) or lower.

Furthermore, a laser apparatus in accordance with the present invention can control energy per pulse (i.e., control energy density) in the state in which the diameter of a pulsed laser beam that is radiated to a target is constantly maintained and control the degree that a pulsed laser beam induces a photo-mechanical effect (i.e., the amount of photo-mechanical force) through such an operation.

Accordingly, there can be provided a basis for a control operation for quantitatively proposing a photo-mechanical effect of a laser.

Hereinafter, a laser apparatus 100 in accordance with an embodiment of the present invention is described with reference to FIGS. 1 to 3.

Referring to FIG. 1, the laser apparatus 100 in accordance with an embodiment of the present invention can generate a photo-mechanical effect as described above. More particularly, the laser apparatus 100 can generate a mechanical effect to an object other than the human body as shown on the upper side of FIG. 1 and can induce a mechanical sense to the human body as shown on the lower side of FIG. 1.

Figure 2:
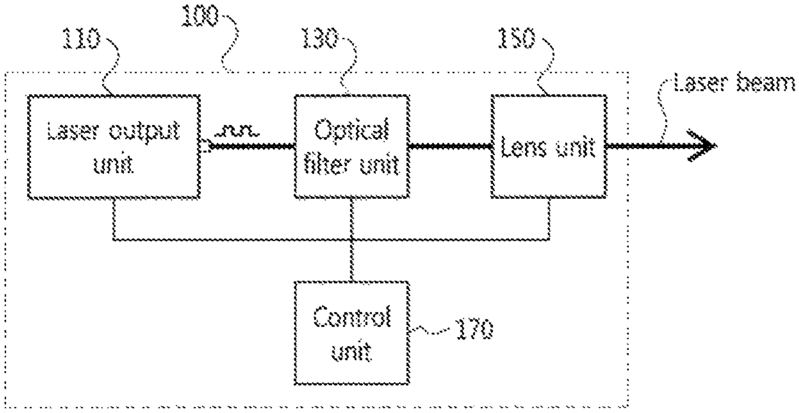
FIG. 2 is a diagram illustrating the configuration of a laser apparatus in accordance with an embodiment of the present invention.

Referring to FIG. 2, the laser apparatus 100 in accordance with an embodiment of the present invention can include a laser output unit 110 for generating a pulsed laser beam, an optical filter unit 130 for controlling power (J/s) of an optical signal that forms the pulsed laser beam, a lens unit 150 for controlling the diameter of the pulsed laser beam, and a control unit 170 for controlling the operations of the laser output unit, the optical filter unit, and the lens unit.

The laser apparatus 100 may further include an input unit for receiving information from a user, an output unit for outputting information related to the operation of the laser apparatus 100, and a communication unit for transmitting and receiving information to and from external devices. The input unit, the output unit, and the communication unit can be controlled by the control unit 170.

The laser output unit 110 outputs a pulsed laser beam and can include a laser driver, a cooler and so on. The laser driver includes a laser medium, an optical pumping unit, an optical resonator and so on and generates an optical signal that forms the pulsed laser beam. Furthermore, the cooler removes heat that may be generated when the laser driver and the laser medium generates an optical signal and functions to protect the laser driver.

The laser output unit 110 can have a variety of forms which can generate a pulsed laser beam. For example, the laser output unit 110 can be a ruby laser, an Nd:YAG laser, an Nd:Glass laser, a laser diode (Ga, Al, As), an excimer laser, or a dye laser. In addition, the laser output unit 110 can have a variety of forms.

Furthermore, the laser output unit 110 can control a variety of parameters of the pulsed laser beam. In particular, the laser output unit 110 can control energy per pulse of the pulsed laser beam in order to generate a photo-mechanical effect. Here, the control of the energy per pulse can be achieved by an operation of controlling power (J/s) of an optical signal that forms the pulsed laser beam or can be achieved by an operation of controlling the pulse width of the pulsed laser beam. In this case, the pulse width preferably is controlled in a range of millisecond (ms) or lower. This is because there is a possibility that a photo-chemical effect or a photo-thermal effect can be induced as described above if the pulse width is controlled in a range exceeding millisecond (ms).

Figure 3:
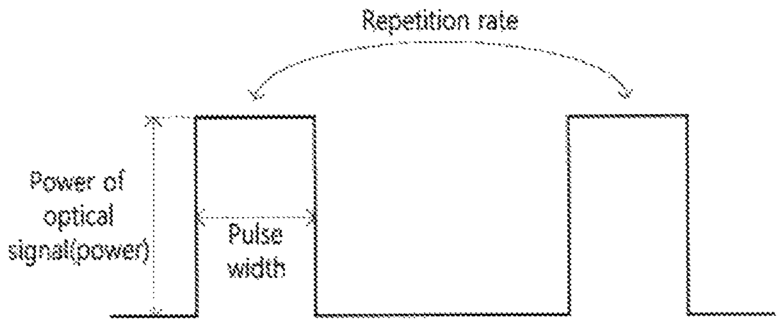
FIG. 3 is a diagram illustrating parameters of a pulsed laser beam.

For reference, from FIG. 3, parameters of the pulsed laser beam, such as power (J/s) of an optical signal, a pulse width, and a repetition rate, can be checked.

Furthermore, the laser output unit 110 preferably controls the energy per pulse to a value of 0.005 mJ or more. As will be described later, this is because in such condition, a photo-mechanical effect can be generated to a skin tissue of the human body and a photo-mechanical effect can be generated to an object other than the human body depending on the materials of the object.

Furthermore, the laser output unit 110 preferably controls the energy per pulse to a value of 9.5 mJ or less. As will be described later, this is because under a condition that the energy per pulse exceeds 9.5 mJ, the degree of a photo-mechanical effect can be increased to the extent that a skin tissue of the human body can be damaged. Accordingly, the energy per pulse preferably is controlled to a value of 9.5 mJ or less in order to ensure safety when a photo-mechanical effect is applied to the human body. Meanwhile, the present invention can be configured in such a way as to limit the output of the laser output unit 110 to 9.5 mJ or less by taking safety into consideration. For example, 1) the present invention may be configured in such a way as to limit the output itself of the laser output unit 110 to 9.5 mJ or less by controlling the operation of the optical pumping unit, or 2) the present invention may be configured in such a way as to additionally install a laser cut-off film capable of cutting off a laser beam and drive the laser cut-off film in case energy per pulse of a pulsed laser exceeds 9.5 mJ.

Meanwhile, when the laser output unit 110 controls energy per pulse of the pulsed laser beam, energy density of the pulsed laser beam that is radiated to a target can also be controlled. More particularly, 1) if the laser output unit 110 increases energy per pulse in the state in which the diameter of a pulsed laser beam radiated to a target is constantly maintained, energy density of the pulsed laser beam radiated to the target can be increased, and 2) if the laser output unit 110 decreases energy per pulse in the state in which the diameter of a pulsed laser beam radiated to a target is constantly maintained, energy density of the pulsed laser beam radiated to the target can be decreased. Accordingly, the strength of photo-mechanical force that is induced by the laser apparatus 100 through such an operation can be increased or decreased. As will be described later, power of induced photo-mechanical force can be increased or decreased by increasing or decreasing energy density of a pulsed laser beam radiated to a target in the state in which the diameter of the pulsed laser beam is constantly maintained.

The optical filter unit 130 controls power (J/s) of an optical signal that forms the pulsed laser beam and can secondarily control energy per pulse of a laser beam that is output by the laser output unit 110 through control of the power.

The optical filter unit 130 can include an attenuator for attenuating power of an optical signal and can attenuate power (J/s) of an optical signal using the attenuator. Accordingly, the optical filter unit 130 can perform an operation of reducing energy per pulse by attenuating power of an optical signal in the state in which a pulse width is constantly maintained.

Meanwhile, if the laser output unit 110 itself has the capability of controlling energy per pulse, the optical filter unit 130 may be selectively mounted on the laser apparatus 100. In this case, the optical filter unit 130 can play an assistant role in finely controlling the energy per pulse. If the laser output unit 110 itself does not have the capability of controlling energy per pulse, the optical filter unit 130 is essentially mounted on the laser apparatus 100 and can play a leading role in controlling energy per pulse.

The lens unit 150 controls the diameter of the pulsed laser beam. The lens unit 150 may include an optical focusing unit (e.g., a convex lens unit) for condensing the pulsed laser beam and an optical diverging unit (e.g., a concave lens unit) for diverging the pulsed laser beam.

Meanwhile, the lens unit 150 1) can constantly maintain an output diameter of a pulsed laser beam (i.e., first operation) or 2) can change an output diameter of a pulsed laser beam (i.e., second operation). For reference, an output diameter of the pulsed laser beam means a diameter at the moment when the pulsed laser beam leaves the laser apparatus.

Figure 4:
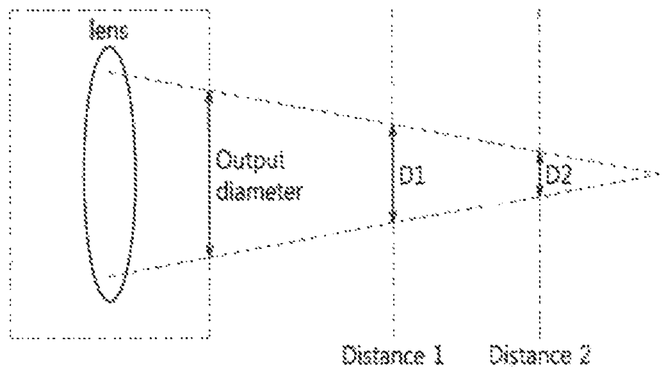
FIGS. 4 and 5 are diagrams showing the operation of a lens unit that may be included in the laser apparatus in accordance with the present invention.

The first operation can be achieved by fixing the construction and deployment of the lens unit 150. The first operation can be used to apply a pulsed laser beam having a constant diameter to a target whose location (or distance) is fixed. This is because when an output diameter of a pulsed laser beam is constantly maintained, the diameter of the pulsed laser beam radiated to (reached by) a target that is distant from the laser apparatus by a fixed distance can also be constantly maintained. FIG. 4 shows an embodiment of the first operation. In the embodiment of FIG. 4, the construction and deployment of the lens unit 150 are fixed, and the lens unit 150 constantly maintains an output diameter of a pulsed laser beam. Accordingly, the diameter of a pulsed laser beam radiated to a target that is distant from the laser apparatus by a distance 1 can maintain D1 constantly, and the diameter of a pulsed laser beam radiated to a target that is distant from the laser apparatus by a distance 2 can maintain D2 constantly.

Figure 5:
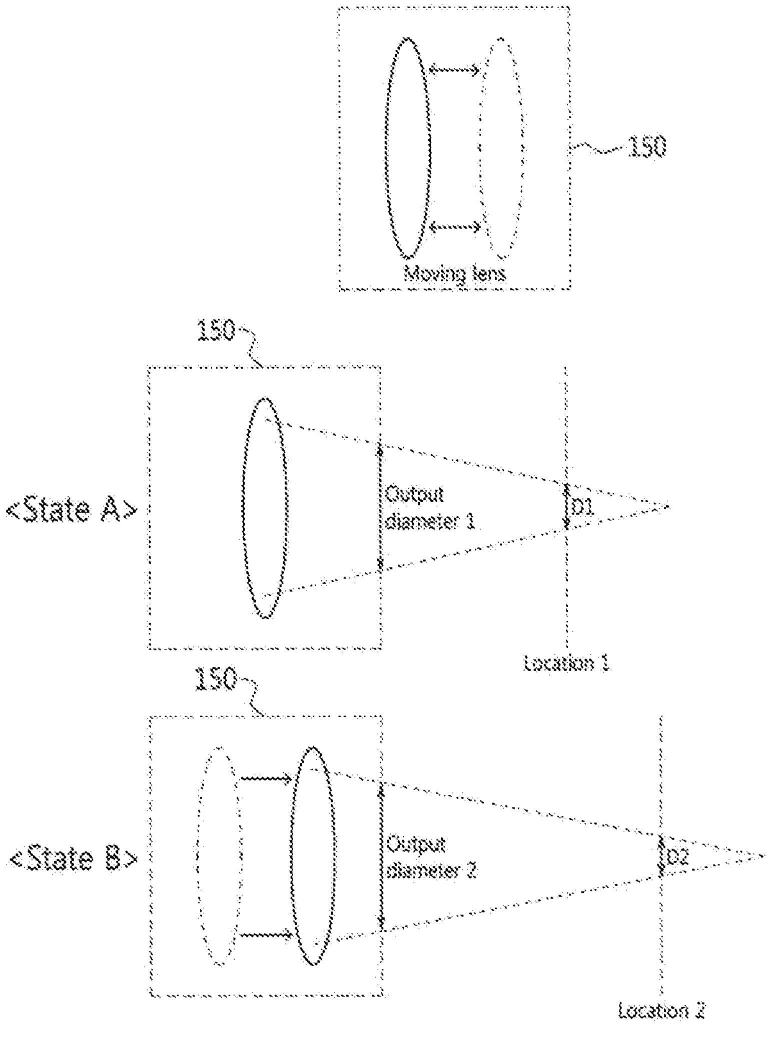

The second operation can be achieved by dynamically changing the construction and deployment of the lens unit 150. More particularly, the lens unit 150 can increase or decrease an output diameter of the pulsed laser team by an operation for selectively disposing the optical focusing unit and the optical diverging unit, an operation for changing a location where the optical focusing unit is disposed, an operation for changing a location where the optical diverging unit is disposed and so on. For reference, FIG. 5 shows an embodiment in which the output diameter of the pulsed laser beam is changed by an operation for changing a location where the optical focusing unit is disposed.

The second operation can be use to apply a pulsed laser beam having a constant diameter to a (movable) target whose location can be changed. The diameter of a pulsed laser beam radiated to (reached by) a (moving) target whose location is changed can be constantly maintained by increasing an output diameter of the pulsed laser beam when the location of the moving target becomes distant from the laser apparatus and by reducing an output diameter of the pulsed laser beam when the location of the moving target becomes close to the laser apparatus. FIG. 5 shows an embodiment of the second operation. In the embodiment of FIG. 5, the lens unit 150 changes an output diameter of the pulsed laser beam depending on a change of the location of a target and constantly maintains the diameter of a beam radiated to the target through such an operation. For example, if the target moves from a location 1 to a location 2, the lens unit 150 increases an output diameter of the pulsed laser beam in proportion to the increased distance and thus identically maintains the diameter of the pulsed laser beam radiated to (reached by) the target. Furthermore, if the target moves from the location 2 to the location 1, the lens unit 150 decreases an output diameter of the pulsed laser beam in proportion to the reduced distance and thus identically maintains the diameter of the pulsed laser beam radiated to (reached by) the target.

As a result, the lens unit 150 can constantly maintain the diameter of a pulsed laser beam that is radiated to (reached by) a fixed or moving object through the first operation or the second operation.

The input unit receives information necessary for the operation of the laser apparatus 100. The input unit can receive basic information for controlling a variety of parameters of the pulsed laser beam and transfer the received information to the control unit 170.

Furthermore, the input unit can include a plurality of enter keys for receiving numbers or alphabet and setting various functions and can further include a variety of function keys for the operation of the laser apparatus 100.

The input unit can be formed of a variety of input devices, such as a pad and a touch screen. In addition to the input devices, the input unit can be formed of a variety of devices.

The output unit displays an operation state and operation results of the laser apparatus 100 and provides specific information to a user. The output unit can display information inputted by a user and information provided to a user as well as various menus. The output unit can be formed of a variety of output devices, such as a Liquid Crystal Display (LCD), Organic Light Emitted Diodes (OLED), and a voice output device.

The communication unit enables the laser apparatus 100 to transmit and receive information to and from external electronic devices. The communication unit can be formed of a variety of wired communication apparatuses or wireless communication apparatuses which satisfy the IEEE standard and may be implemented using various communication apparatuses in addition to the IEEE standard.

Accordingly, the laser apparatus 100 may be configured in such a way as to be controlled by an external electronic device through the communication unit and may be configured in such a way as to operate in conjunction with a variety of electronic devices, such as a display device and a mobile terminal.

The control unit 170 controls various elements of the laser apparatus 100, including the laser output unit 110, the optical filter unit 130, the lens unit 150, the input unit, the output unit, and the communication unit.

The control unit 170 can include at least one operation means and at least one storage means. The operation means can be a general-purpose Central Processing Unit (CPU), but may be a programmable device (e.g., CPLD or FPCA), an ASIC, or a microcontroller chip that is implemented for specific purposes. Furthermore, the storage means may be a volatile memory device, a non-volatile memory device, a non-volatile electromagnetic storage device, or memory within the operation means.

The control unit 170 can generally control energy per pulse of the pulsed laser beam by controlling the operations of the laser output unit 110 and the optical filter unit 130. More particularly, the control unit 170 can control parameters, such as a pulse width and power (J/s) of an optical signal, by controlling the operations of the laser output unit 110 and the optical filter unit 130. The control unit 170 can control energy per pulse by an operation of controlling the parameters. In this case, the energy per pulse preferably is controlled within a value ranging from 0.005 mJ to 9.5 mJ as described above.

Furthermore, the control unit 170 can constantly maintain the diameter of a pulsed laser beam radiated to (reached by) a target by controlling the operation of the lens unit 150. More particularly, the control unit 170 can constantly maintain the diameter of a pulsed laser beam radiated to (reached by) a target by driving the lens unit in the first operation state when the location of the target is fixed and by driving the lens unit in the second operation state when the location of the target is changed.

Furthermore, the control unit 170 can operate in a control mode in which photo-mechanical force is increased or in a control mode in which photo-mechanical force is decreased. 1) First, if the control unit 110 operates in the control mode in which photo-mechanical force is increased, the control unit 170 can perform a control operation for increasing energy per pulse (i.e., increasing energy density) in the state in which the diameter of a pulsed laser beam radiated to a target is constantly maintained, thereby being capable of increasing photo-mechanical force induced by the pulsed laser beam through the control operation. 2) Furthermore, if the control unit 170 operates in the control mode in which photo-mechanical force is decreased, the control unit 170 can perform a control operation for decreasing energy per pulse (i.e., decreasing energy density) in the state in which the diameter of a pulsed laser beam radiated to a target is constantly maintained, thereby being capable of decreasing photo-mechanical force induced by the pulsed laser beam through the control operation.

Hereinafter, a laser apparatus in accordance with another embodiment of the present invention is described with reference to FIG. 6.

Figure 6:
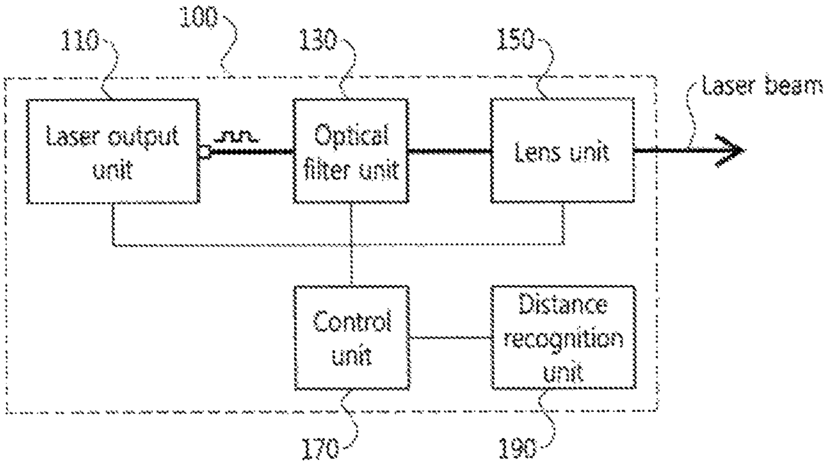
FIG. 6 is a diagram illustrating the configuration of a laser apparatus in accordance with another embodiment of the present invention.

Referring to FIG. 6, like in the aforementioned embodiment, the laser apparatus 100 in accordance with another embodiment of the present invention may include a laser output unit 110, an optical filter unit 130, a lens unit 150, an input unit, an output unit, a communication unit, a control unit 170 and so on. The laser apparatus 100 may further include a distance recognition unit 190 for recognizing a distance between the laser apparatus and a target.

The distance recognition unit 190 recognizes a distance between the laser apparatus 100 and a target (i.e., a target radiated by a pulsed laser beam). The distance recognition unit 190 can generate distance information by measuring a distance between the laser apparatus 100 and the target in real time and can transfer the generated information to the control unit 170.

The control unit 170 can control the operation of the lens unit based on the distance information received from the distance recognition unit 190. 1) For example, if distance information received from the distance recognition unit 190 is fixed to a specific value, the control unit 170 can control the lens unit 150 in the first operation state. 2) Furthermore, if distance information received from the distance recognition unit 190 is changed in real time, the control unit 170 can control the lens unit 150 in the second operation state. In this case, the control unit 170 can change an output diameter of a pulsed laser beam in real time based on the distance information that is changed in zeal time and can constantly maintain the diameter of the pulsed laser beam radiated to (reached by) an object through such a control operation.

Meanwhile, the distance recognition unit 190 can recognize (or measure) a distance in various manners. For example, the distance recognition unit 190 can measure a distance between the laser apparatus 100 and a target by analyzing the time that is taken for an emitted laser or ultrasonic waves to be returned back or a change of the cycle or amplitude of a laser or ultrasonic waves. Furthermore, the distance recognition unit 190 can radiate infrared rays to a target and measure a distance by detecting the reception sensitivity of reflection light or measure a distance using a GPS. Furthermore, the distance recognition unit 190 may measure a distance using two or more of the ultrasonic wave method, the infrared ray method, the laser method, and the GPS method at the same time. In this case, the distance recognition unit 190 can determine a final distance value by calculating the mean of calculated values. For reference, if a distance is measured using a laser, the distance recognition unit 190 can operate in conjunction with the laser output unit 110. That is, the distance recognition unit 190 may measure a distance using a pulse laser beam generated from the laser output unit 110 in the state in which an additional laser apparatus for measuring a distance is not mounted on the distance recognition unit 190.

The laser apparatus 100 described above in accordance with the present invention can generate a photo-mechanical effect using a pulse laser beam and control the photo-mechanical effect. Thus, the laser apparatus 100 can be used in a variety of industry fields that require a mechanical stimulus.

In particular, the laser apparatus 100 in accordance with the present invention can generate a photo-mechanical effect to a skin tissue of the human body and can also be applied to a variety of haptic devices that require a mechanical sense.

Experiment Example 1

Examples in which the laser apparatus 100 in accordance with an embodiment of the present invention generates a photo-mechanical effect are experimentally verified with reference to FIGS. 7 to 11.

Figure 7:
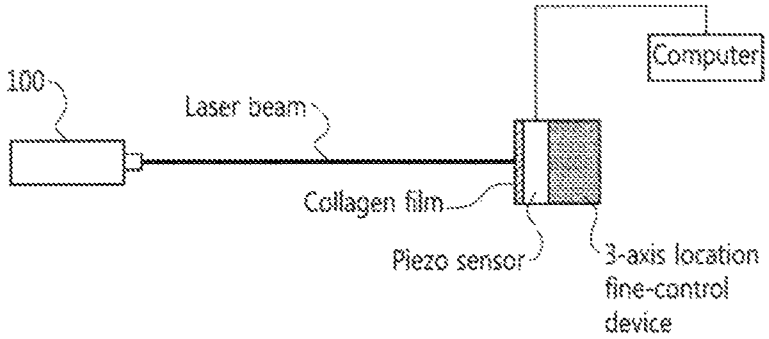
FIG. 7 is a diagram illustrating the configuration of an experiment system for verifying photo-mechanical effects of the laser apparatus in accordance with an embodiment of the present invention.

FIG. 7 shows the construction of an experiment system for verifying a photo-mechanical effect of the laser apparatus 100 in accordance with an embodiment of the present invention.

This experiment system may include the laser apparatus 100, a collagen film, a piezo sensor, a 3-axis location fine-control device, a computer and so on.

The laser apparatus 100 is the laser apparatus 100 described above in accordance with the present invention.

In the present experiment, as an embodiment of the laser apparatus 100, a laser apparatus having a wavelength of 532 nm, a pulse width of 5 ns, a repetition rate of 10 Hz, and a beam diameter (i.e., a diameter when the pulsed laser beam is radiated to the collagen film) of 0.48 mm was used.

The collagen film is a type I collagen film (Neskin®-F, Medira, a thickness of 300 μm to 500 μm) used for facilitates epidermal healing & substitute and was modeled from a skin tissue of the human body. Since 90% or more of a biological tissue is formed of the type I collagen film, an effect that will be generated from a bio skin tissue can be indirectly experimented using the collagen film.

A skin thickness (epidermis) of the human body is different according to a person, sex, and race. Thus, in the present experiment, an experiment was primarily performed on 5 sheets of collagen films, and an experiment was secondarily performed on 10 sheets of collagen films. This is because a skin thickness of the human body can be changed within a range of the 5 to 10 sheets of collagen films according to a person, sex, and race. Weight and thickness of the 5 sheets of collagen films and the 10 sheets of collagen films can be seen from Table 1.

TABLE 1

| Number of collagen films | Weight [g] | Thickness [mm] |
|---|---|---|
| 5 | 0.12 | 0.15 |
| 10 | 0.23 | 0.31 |

Meanwhile, the collagen film was used with it attached to the piezo sensor.

The piezo sensor is a device for expressing an external mechanical stimulus in the form of an electrical output signal. Accordingly, in the present experiment, a mechanical change induced from the collagen films was monitored using the piezo sensor.

Meanwhile, in the present experiment, the piezo sensor whose surface was coated (LFT1-028K, measurement specialties) was used in order to minimize an influence that might be applied to a surface of the piezo sensor when attaching the collagen film to the piezo sensor.

The 3-axis location fine-control device finely controls the location of the piezo sensor. Furthermore, the computer receives a signal from the piezo sensor, analyzes the received signal, and displays analyzed results.

The aforementioned experiment system performed the following experiment.

1) An experiment in which a pulsed laser beam whose energy per pulse was 0.05 mJ was radiated to the 5 sheets of collagen films was performed.

2) The pulsed laser beam was radiated with frequency of 10 Hz. More particularly, the pulsed laser beam was radiated at moments, such as right before 0.05 [s], right before 0.15 [s], right before 0.25 [s], and right before 0.35 [s].

3) The signal of the piezo sensor output in this experiment process was analyzed.

Figure 8:
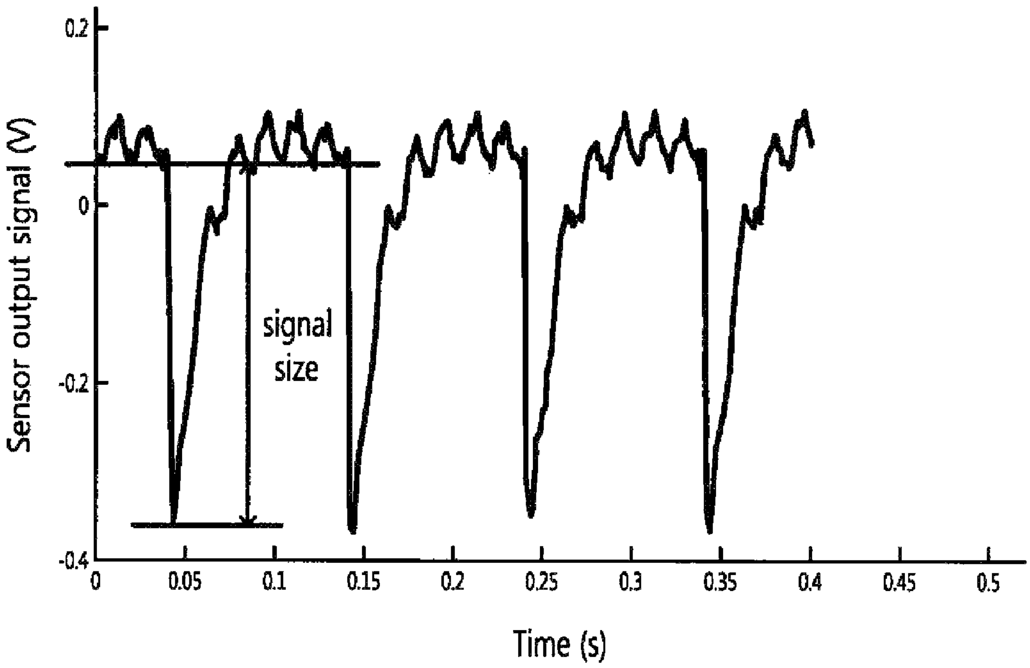
FIG. 8 is a graph showing the output signal of a piezo sensor.

FIG. 8 is a graph showing the results of such an experiment. From FIG. 8, it can be seen that the output signal of the piezo sensor is generated with frequency of 10 Hz that corresponds to a repetition rate of the radiated laser beam. Furthermore, it can be seen that points of time at which the signal is generated from the piezo sensor are identical with points of time at which the pulsed laser beam is radiated (i.e., right before 0.05 [s], right before 0.15 [s], right before 0.25 [s], and right before 0.35 [s]).

Accordingly, the experiment results reveal that the pulsed laser beam induces a photo-mechanical effect. Furthermore, the amount of the induced photo-mechanical force may be calculated by analyzing the amount of the output signal of the piezo sensor.

The following experiment was also performed using the aforementioned experiment system.

1) First, the output signal of the piezo sensor was monitored while radiating a pulsed laser to the 5 sheets of collagen films using the laser apparatus 100. In particular, the experiment was performed while sequentially changing energy per pulse of the pulsed laser beam radiated by the laser apparatus 100.

2) Next, the output signal of the piezo sensor was monitored while radiating a pulsed laser to the 10 sheets of collagen films using the laser apparatus 100. Likewise, the experiment was performed while sequentially changing energy per pulse of the pulsed laser beam radiated by the laser apparatus 100.

Meanwhile, in the present experiment, since the experiment was performed using a pulse width of 5 ns that satisfies a range of millisecond (ms) or lower, energy per pulse was changed by changing power (J/s) of an optical signal that formed the pulsed laser beam.

Figure 9:
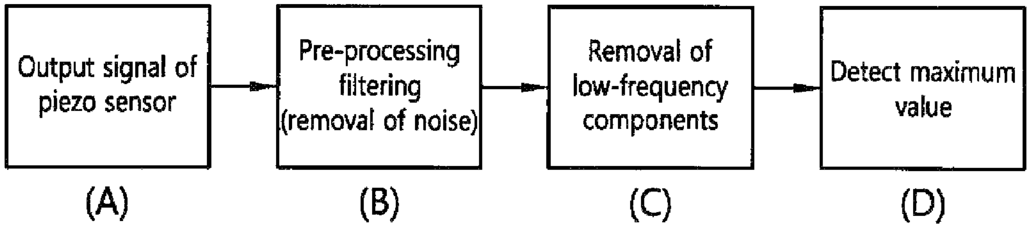
FIG. 9 is a block diagram showing a process of processing the output signal of the piezo sensor.

Furthermore, the output signal of the piezo sensor was analyzed through processes, such as i) pre-processing filtering, ii) the removal of low-frequency components, and iii) the detection of a maximum value as in FIG. 9. That is, the output signal of the piezo sensor was analyzed by a process of primarily removing noise through pre-processing filtering, secondarily removing low-frequency components, and detecting a maximum value of the output signal. Furthermore, results were expressed using the mean of the detected maximum value.

Figure 10:
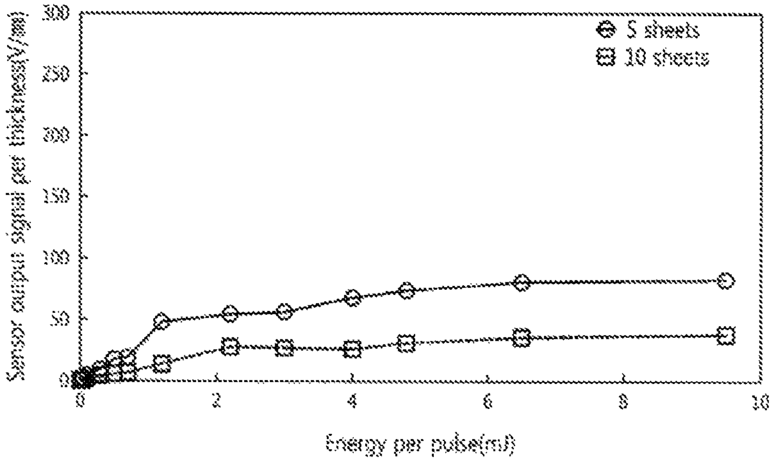
FIGS. 10 and 11 are graphs showing a relationship between 'energy per pulse of the laser apparatus' and 'the output signal of the piezo sensor' in Experiment Example 1.
Figure 11:
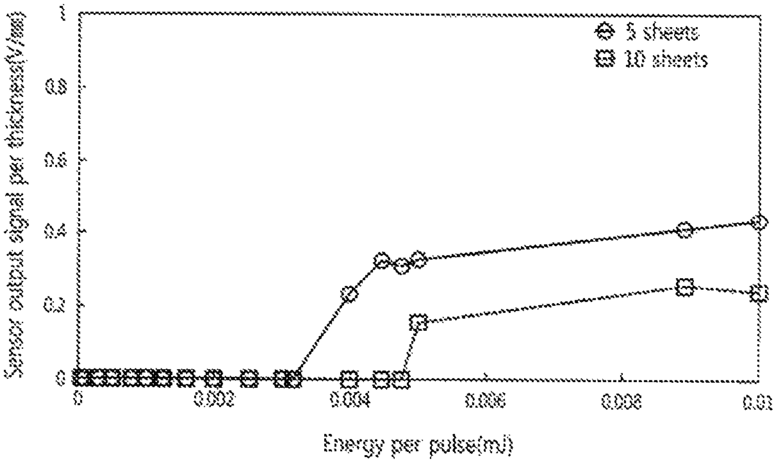

FIGS. 10 and 11 are graphs showing the results of such an experiment.

FIG. 10 is a graph showing a change of the output signal of the piezo sensor depending on a change of energy per pulse. In FIG. 10, a horizontal axis is energy per pulse, and a vertical axis is signals obtained by dividing the output signal of the piezo sensor as per thickness (i.e., the output signal of the sensor per thickness).

Furthermore, FIG. 11 is a graph showing an enlarged portion of part of the graph of FIG. 10. More particularly, the graph of FIG. 11 shows a region surrounded by dotted lines in FIG. 10.

From FIGS. 10 and 11, it can be seen that 1) a photo-mechanical effect was induced when energy per pulse of 0.00398 mJ or more was applied to the 5 sheets of collagen films and that 2) a photo-mechanical effect was induced when energy per pulse of 0.005 mJ or more was applied to the 10 sheets of collagen films. Accordingly, it can be seen that threshold energy for inducing the photo-mechanical effects of the 5 to 10 sheets of collagen films is located within a range of 0.00398 mJ to 0.005 mJ.

Meanwhile, as described above, a skin thickness of a common person is within 5 to 10 sheets of collagen films. Accordingly, if a pulsed laser beam having energy per pulse of at least 0.005 mJ or more is applied to the human body, a photo-mechanical effect can be induced irrespective of a difference in the skin thickness of each person.

From FIGS. 10 and 11, it can be seen that an upper limit to which energy per pulse is increased is set to about 9.5 mJ. This is because a collagen film was damaged in an experiment in which the energy per pulse was set to 9.5 mJ or more. Accordingly, in order to secure safety when a pulse laser beam is radiated to the skin of the human body, the energy per pulse preferably is limited to 9.5 mJ or less.

Experiment Example 2

An additional experiment is described below with reference to FIGS. 12 and 13.

The additional experiment was performed using the same method as that of Experiment Example 1 except that the diameter of a pulsed laser beam, from among the parameters of the laser apparatus 100, was changed. More particularly, the experiment was performed using the following method.

1) In the experiment, the laser apparatus 100 having a wavelength of 532 nm, a pulse width of 5 ns, a repetition rate of 10 Hz, and a beam diameter (i.e., a diameter when the pulsed laser beam is radiated to a collagen film) of 8 mm was used.

2) Furthermore, the output signal of the piezo sensor was monitored while radiating the pulsed laser beam to the 5 sheets of collagen films using the laser apparatus 100. In particular, the experiment was performed while sequentially changing energy per pulse of the pulsed laser beam radiated by the laser apparatus 100.

3) Furthermore, the output signal of the piezo sensor was monitored while radiating a pulsed laser beam to the 10 sheets of collagen films using the laser apparatus 100. Likewise, even in this case, the experiment was performed while sequentially changing energy per pulse of the pulsed laser beam radiated by the laser apparatus 100.

Even in the present experiment, a pulsed laser beam whose pulse width was fixed to 5 ns was used. Thus, energy per pulse was changed by changing power (J/s) of an optical signal that forms the pulsed laser beam.

Furthermore, the output signal of the piezo sensor, like in Experiment Example 1, was analyzed through processes, such as i) pre-processing filtering, ii) the removal of low-frequency components, and iii) the detection of a maximum value.

Figure 12:
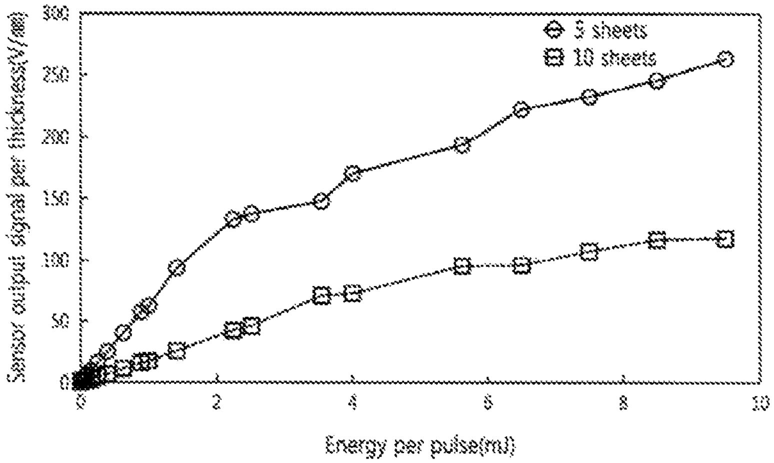
FIGS. 12 and 13 are graphs showing a relationship between 'energy per pulse of the laser apparatus' and 'the output signal of the piezo sensor' in Experiment Example 2.
Figure 13:
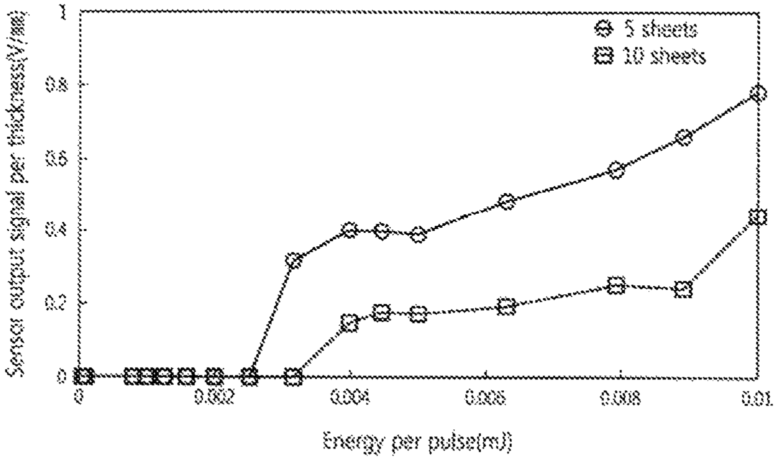

FIGS. 12 and 13 axe graphs showing the results of such an experiment.

First, FIG. 12 is a graph showing a change of the output signal of the piezo sensor, which is attributable to a change of energy per pulse. In FIG. 12, like in Experiment Example 1, a horizontal axis is energy per pulse, and a vertical axis is signals obtained by dividing the output signal of the piezo sensor as per thickness (i.e., the output signal of the piezo sensor per thickness).

Furthermore, FIG. 13 is a graph showing an enlarged portion of part of the graph of FIG. 12.

From FIGS. 12 and 13 it can be seen that 1) a photo-mechanical effect was induced when energy per pulse of 0.00316 mJ or more was applied to the 5 sheets of collagen films, and 2) a photo-mechanical effect was induced when energy per pulse of 0.00396 mJ or more was applied to the 10 sheets of collagen films.

Accordingly, it can be seen that threshold energy for inducing the photo-mechanical effects in the 5 to 10 sheets of collagen films (even when parameters of the pulse laser beam is changed) was located in a range of 0.00316 mJ to 0.00398 mJ based on the experiment results. Furthermore, the same conclusion as that of Experiment Example 1, indicating that 'when a pulsed laser beam having energy per pulse of at least 0.005 mJ or more is applied to the human body, a photo-mechanical effect can be induced irrespective of a difference in the skin thickness of each person', can be checked.

Even in this experiment, an upper limit to which energy per pulse was increased was set to 9.5 mJ. This is because the collagen film was damaged in an experiment in which the energy per pulse was set to 9.5 mJ or more as described above in connection with Experiment Example 1. Accordingly, in order to secure safety when a pulse laser beam is radiated to the skin of the human body, the energy per pulse preferably is limited to 9.5 mJ or less.

Experiment Example 3

Figure 14:
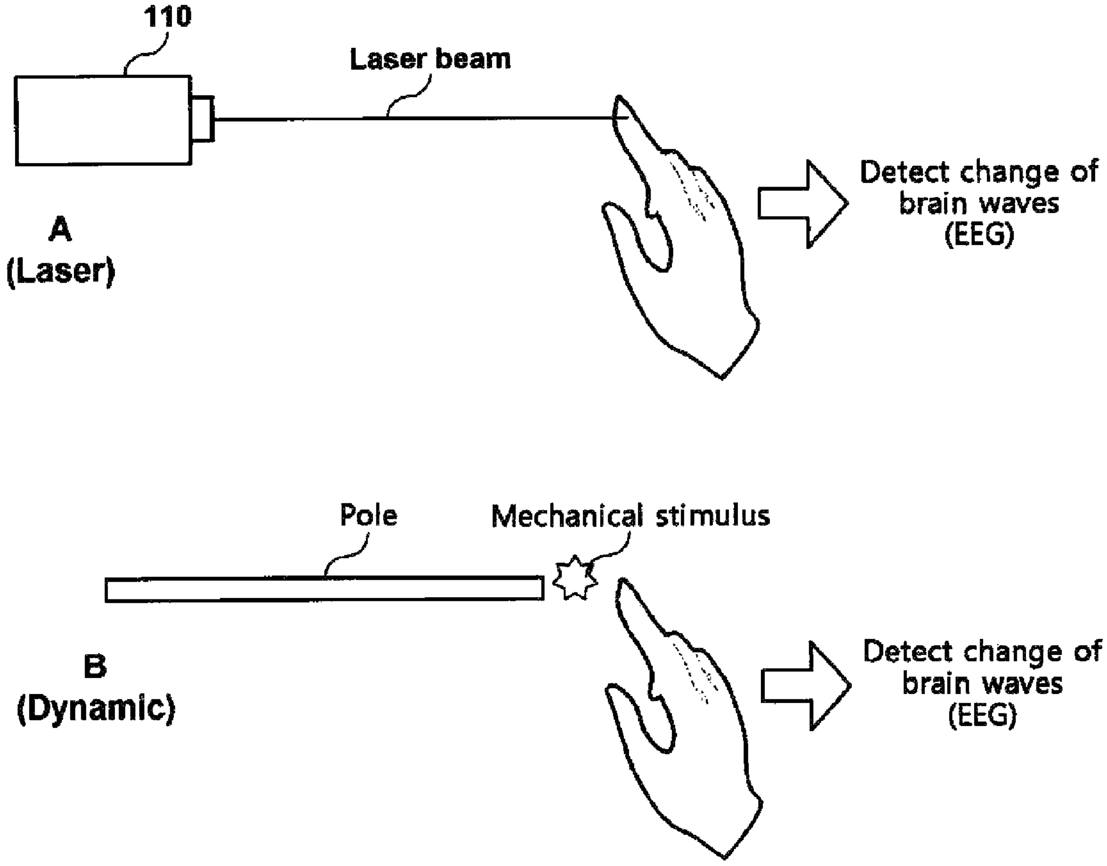
FIG. 14 is a diagram illustrating yet another experiment (Experiment Example 3) for verifying photo-mechanical effects of the laser apparatus in accordance with an embodiment of the present invention.
Figure 15:
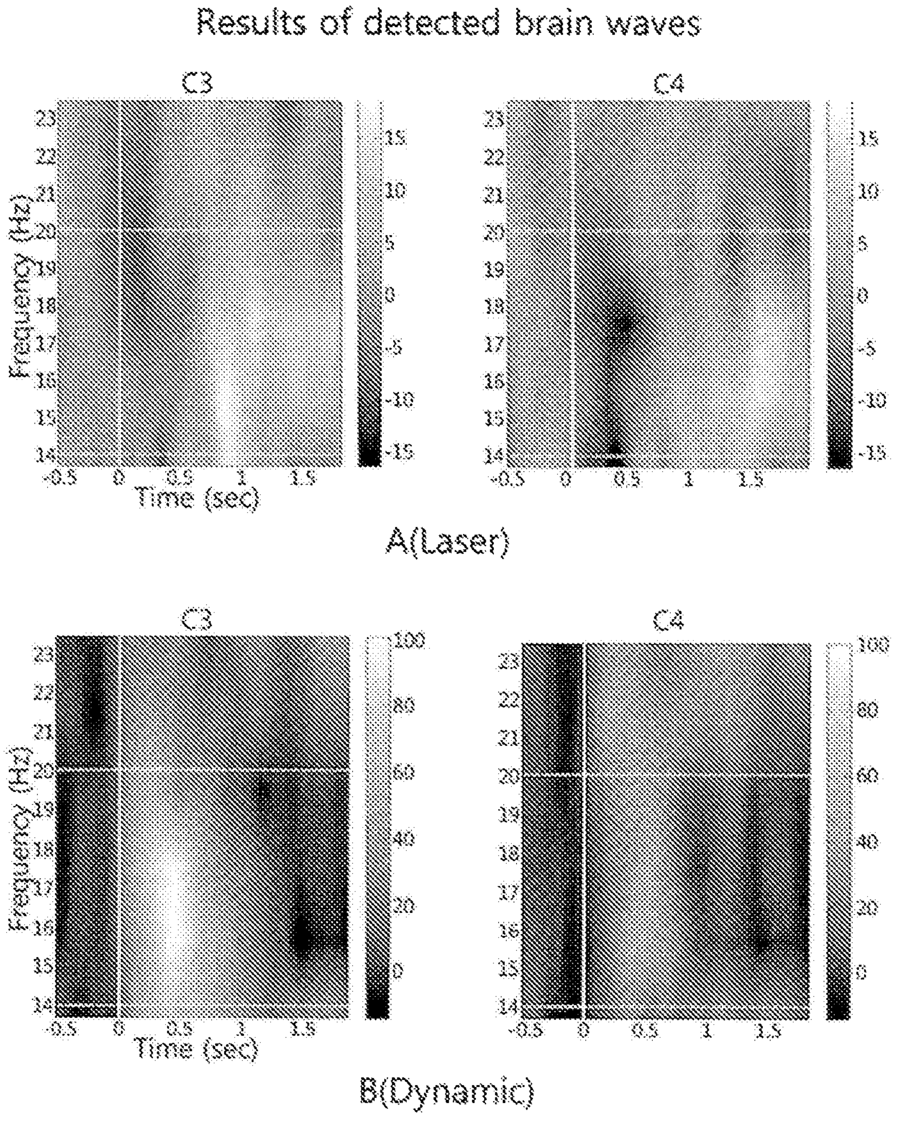
FIGS. 15 and 16 are graphs showing the results of such an experiment of FIG. 14.
Figure 16:
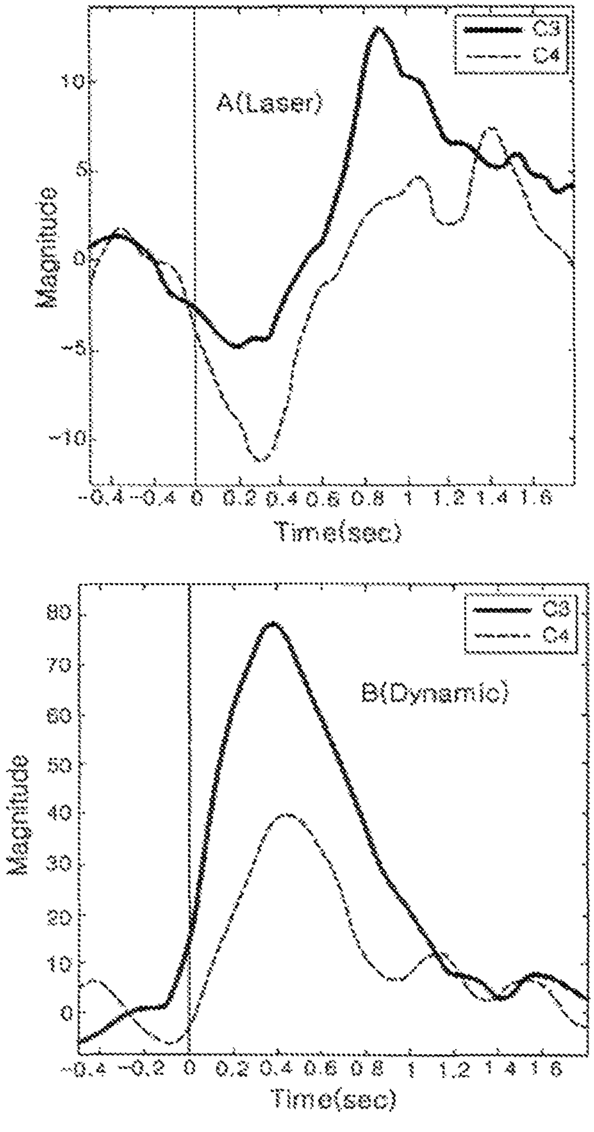

An example in which a 'photo-mechanical sense' is induced by a 'pulsed laser beam' generated from the laser apparatus 100 is experimentally verified with reference to FIGS. 14 to 16.

In order to verify the induction of a photo-mechanical sense by a pulsed laser beam, the following experiment was performed.

1) First, a change of brain waves was monitored using an Electro Encephalo Graphy (EEG) device while radiating a pulsed laser beam generated from the laser apparatus 100 to a right hand (FIG. 14A—an experiment group).

2) Furthermore, likewise, a change of brain waves was monitored using an EEG device while giving a mechanical stimulus to a right hand using a pole (FIG. 14B—a comparison group).

In this experiment, the pulsed laser beam having a wavelength of 532, a pulse width of 5 ns, energy per pulse of 1.9 mJ, and a beam diameter of 0.48 mm was used, and the mechanical stimulus was applied using the pole having the same diameter as the pulsed laser beam. Furthermore, the monitoring of brain waves using the EEG device was carried out in regions C3 and C4, that is, sensitive cortexes of the entire region of the brain.

FIGS. 15 and 16 are graphs showing the resulting data of such an experiment.

FIGS. 15 and 16 show that the mean size of brain waves was significantly increased in the same frequency region of the brain waves both in the brain wave reactions of the experiment group (i.e., whose brain wave reaction was monitored in the state in which the pulsed laser beam was applied) and the comparison group (i.e., whose brain wave reaction was monitored in the state in which the mechanical stimulus was given using the pole). In an experiment in which the pulsed laser beam was applied, a brain wave reaction was delayed for some time, but a phenomenon in which the sensitive cortex regions (i.e., regions C3 and C4) of the brain themselves were activated by the pulsed laser beam could be clearly checked. It can also be seen that in the shape of a brain wave reaction graph when the pulsed laser beam was applied, the mean size of brain waves was increased in the same frequency region of the brain waves like in a case where the pole stimulus (pure mechanical stimulus) was applied except a region where a reaction was delayed.

Accordingly, it can be verified that a photo-mechanical sense is induced by the pulsed laser beam through such an experiment.

Experiment Example 4

Experiment examples related to control of the diameter and energy density of a pulsed laser beam are described below with reference to FIGS. 17 and 18.

The following experiment was performed to research a method of controlling parameters so as to control a photo-mechanical effect.

1) A pulsed laser beam was radiated to fingers of subjects using the laser apparatus 100 in accordance with the present invention, and reactions of the subjects were examined.

2) The reactions of the subjects were classified into "no feeling", "feeling a mechanical sense (or a contact feeling, a pressure sense)", and "pain (ache)".

3) The experiment was performed while changing energy per pulse (i.e., changing energy density) in the state in which the diameter of the pulsed laser beam (i.e., a beam diameter when the pulsed laser beam is radiated to the finger) is constantly maintained.

Table 2 below shows beam diameters, energy densities, and the number of subjects used in this experiment. In the 4 types of beam diameters, the experiment was performed using 18 combinations of energy densities.

TABLE 2

| Diameter of pulsed laser beam [mm] | Energy density [J/cm$^2$] | Number of subjects [n] |
|---|---|---|
| 0.1 | 12.7388535 | 10 |
| | 16.5605095 | |
| | 20.3821656 | |
| | 24.2038216 | |
| 0.43 | 0.20669 | 10 |
| | 0.41338 | |
| | 0.62006 | |
| | 0.82675 | |
| | 1.03344 | |
| 0.52 | 0.47111144 | 10 |
| | 0.61244488 | |
| | 0.75377831 | |
| | 0.89511174 | |
| 0.87 | 0.05049 | 10 |
| | 0.10098 | |
| | 0.15147 | |
| | 0.20196 | |
| | 0.25245 | |

Figure 17:
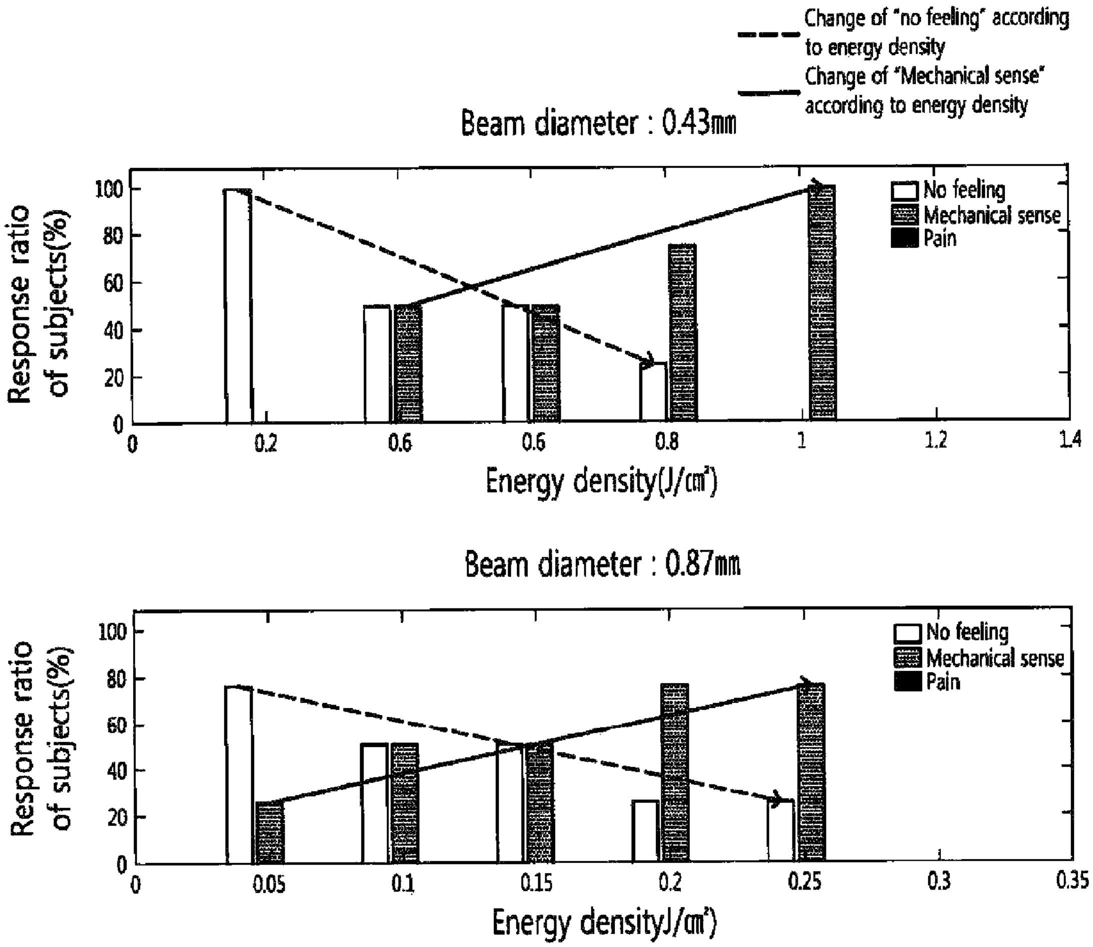
FIGS. 17 and 18 are graphs showing the results of an experiment (Experiment Example 4) performed under a condition in which energy per pulse is changed (i.e., a change of energy density) in the state in which the diameter of a pulsed laser beam is constantly maintained.
Figure 18:
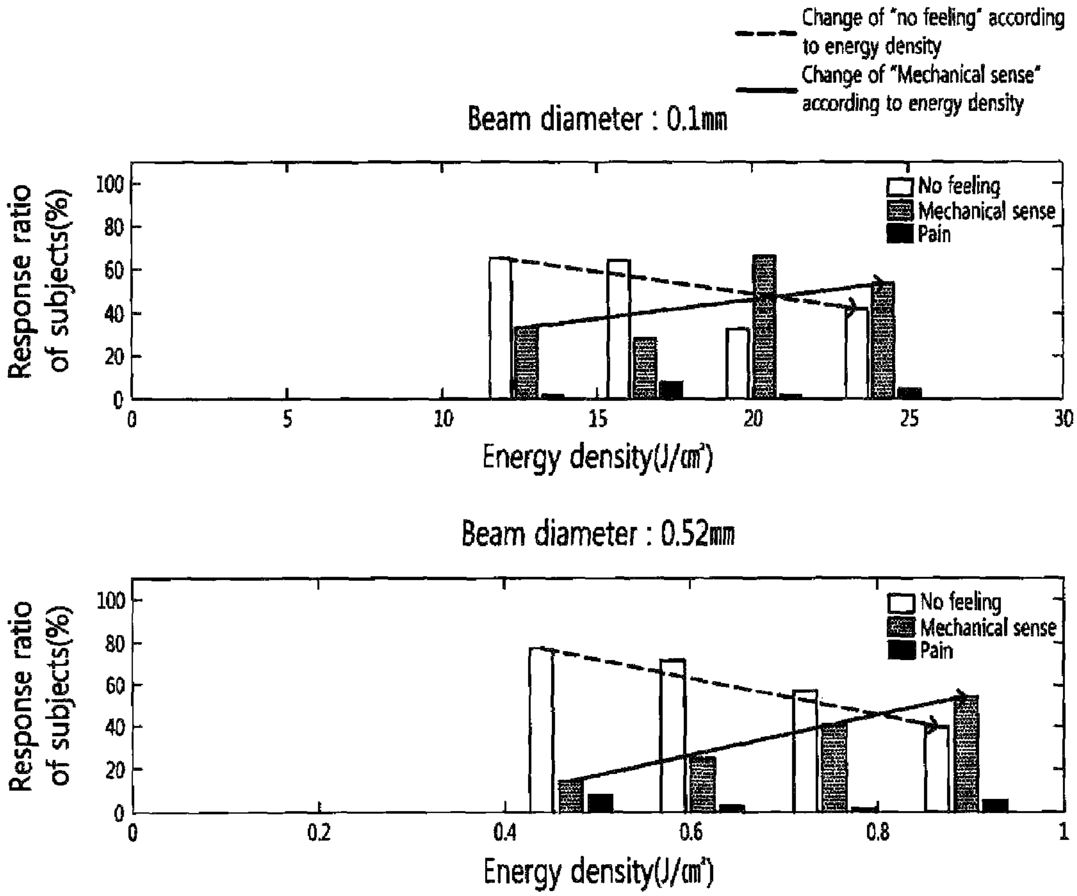

FIGS. 17 and 18 are graphs showing the summarized results of the experiment that was performed under the conditions of Table 2.

From FIGS. 17 and 18, it can be seen that if energy per pulse (i.e., energy density) was increased in the state in which the diameter of the pulsed laser beam radiated to the fingers was constantly maintained (e.g., 0.1 mm, 0.43 mm, 0.52 mm, and 0.87 mm), a ratio of subjects who recognized the mechanical sense or pain (i.e., a mechanical sense having strong strength) was also increased. Furthermore, it can be seen that if energy per pulse (i.e., energy density) was decreased in the state in which the diameter of the pulsed laser beam radiated to the fingers was constantly maintained (e.g., 0.1 mm, 0.43 mm, 0.52 mm, and 0.87 mm), a ratio of subjects who recognized the mechanical sense or pain was also decreased.

This is because if energy per pulse (i.e., energy density) was increased in the state in which the diameter of the pulsed laser beam was constantly maintained, induced photo-mechanical force was increased in proportion to the energy density and the subjects who were insensitive to a mechanical stimulus recognized the mechanical stimulus as the photo-mechanical force increased. Furthermore, in contrast, this is because if energy per pulse i.e., energy density) was decreased in the state in which the diameter of the pulsed laser beam was constantly maintained, induced photo-mechanical force was decreased in proportion to the energy density and the subjects who were sensitive to a mechanical stimulus could not recognize the mechanical stimulus as the photo-mechanical force decreased.

As a result, such an experiment reveals that photo-mechanical force induced by a pulsed laser beam can be controlled by controlling energy per pulse (i.e., controlling energy density) in the state in which the diameter of the pulsed laser beam is constantly maintained.

The present invention can generate a photo-mechanical effect using a pulsed laser beam. More particularly, the present invention can generate a photo-mechanical, effect using a pulse laser beam having a pulse width of millisecond (ms) or lower.

Furthermore, the present invention can generate a photo-mechanical effect, in particular, in the skin of the human body using a pulsed laser beam. More particularly, the present invention can generate a photo-mechanical effect in the human body using a pulse laser beam whose energy per pulse is controlled to a value of 0.005 mJ or more. Accordingly, the present invention can be used as a device for proposing a mechanical sense.

Furthermore, the present invention can generate a photo-mechanical effect while not damaging the skin of the human body. More particularly, the present invention can generate a photo-mechanical effect while not damaging the skin of the human body by controlling energy per pulse in a range of 0.005 mJ to 9.5 mJ.

Furthermore, the present invention can increase or decrease implemented photo-mechanical force. More particularly, the present invention can increase or decrease photo-mechanical force by increasing or decreasing energy per pulse of a pulsed laser beam (i.e., increasing or decreasing energy density) in the state in which the pulsed laser beam has a pulse width of ms or lower and the pulsed laser beam has a constant diameter.

Furthermore, the present invention can constantly maintain an output diameter of a pulsed laser beam and can control energy per pulse of the pulsed laser beam in the state in which the output diameter is constantly maintained. Accordingly, the diameter of a pulsed laser beam that is radiated to a target located at a fixed distance from the laser apparatus can be constantly maintained. In this state, induced photo-mechanical force can be controlled by controlling energy per pulse (i.e., controlling energy density).

Furthermore, the present invention can constantly maintain the diameter of a pulsed laser beam radiated to a target even if a distance between the laser apparatus and the target is changed. More particularly, the present invention can be configured in such a way as to change an output diameter of a pulsed laser beam in response to a change of the distance between the laser apparatus and a target. Accordingly, the diameter of the pulsed laser beam radiated to (reached by) the target can be constantly maintained. Accordingly, induced photo-mechanical force can be changed by controlling energy per pulse (i.e., controlling energy density) in the state in which the diameter of the pulsed laser beam radiated to the target is constantly maintained.

Furthermore, the present invention can also be used in haptic devices. More particularly, the present invention can be applied to a haptic field because it can propose somethesis to the skin of the human body based on a photo-mechanical effect. In particular, the present invention can propose somethesis in a safe state while maintaining a characteristic unique to a laser, such as non-contact, because it can propose somethesis using a photo-mechanical stimulus not using a photo-chemical or photo-thermal stimulus of a laser.

Furthermore, if the present invention is used in a haptic field, the present invention can quantitatively control a mechanical stimulus unlike existing haptic devices. More particularly, in conventional haptic devices, it is difficult to quantitatively control a mechanical stimulus because the conventional haptic devices suggest a mechanical stimulus using a vibration device, air pressure, and a pin arrangement. However, the present invention can quantitatively control a mechanical stimulus by controlling energy per pulse of a pulsed laser beam.

Furthermore, if the present invention is used in a haptic field, unlike existing haptic devices, the present invention can secure temporal reliability of a mechanical stimulus (i.e., reliability regarding whether or not a target point of time is identical with an actual stimulus point of time) or spatial reliability of a mechanical stimulus (i.e., reliability regarding whether or not a target portion is identical with an actual stimulus portion). More particularly, in conventional haptic devices, it is difficult to secure the temporal reliability or spatial reliability of a mechanical stimulus because the conventional haptic devices suggest a mechanical stimulus using a vibration device, air pressure, and a pin arrangement and due to a fundamental limit of a contact type. However, the present invention can secure temporal reliability using the characteristic of a laser beam that moves at the speed of light and can also secure spatial reliability through a fine movement of a laser beam.

The embodiments of the present invention have been disclosed for illustrative purposes, and the present invention is not restricted by the embodiments. Furthermore, those skilled in the art may modify and change the present invention in various ways within the spirit and range of the present invention, and the modifications and changes should be construed as belonging to the scope of the present invention.

What is claimed is:

1. A laser apparatus for outputting a laser beam, wherein the laser apparatus outputs a pulsed laser beam and generates a photo-mechanical effect by controlling energy of the pulsed laser beam, wherein the laser apparatus controls the photo-mechanical effect by controlling the energy of the pulsed laser beam in a state in which a diameter of the pulsed laser beam is constantly maintained, and wherein the laser apparatus is operable in a mode in which photo-mechanical force is increased and in a mode in which photo-mechanical force is reduced, and the laser apparatus increases energy per pulse of the pulsed laser beam in the mode in which photo-mechanical force is increased and decreases energy per pulse of the pulsed laser beam in the mode in which photo-mechanical force is reduced.

2. The laser apparatus of claim 1, wherein the laser apparatus controls energy per pulse of the pulsed laser beam for inducing the photo-mechanical effect.

3. The laser apparatus of claim 2, wherein the energy per pulse is controlled to a value of 0.005 mJ or more.

4. The laser apparatus of claim 3, wherein the energy per pulse is controlled to a value ranging from 0.005 mJ to 9.5 mJ.

5. The laser apparatus of claim 4, wherein the laser apparatus is used to apply a mechanical stimulus to a human body.

6. The laser apparatus of claim 4, wherein the laser apparatus controls the energy per pulse by controlling power or a pulse width of laser output light.

7. The laser apparatus of claim 6, wherein the pulse width is controlled in a range of millisecond (ms) or lower.

8. A laser apparatus for outputting a laser beam, wherein the laser apparatus outputs a pulsed laser beam and generates a photo-mechanical effect by controlling energy of the pulsed laser beam, wherein the laser apparatus controls the photo-mechanical effect by controlling the energy of the pulsed laser beam in a state in which a diameter of the pulsed laser beam is constantly maintained, and wherein the laser apparatus performs a first operation for constantly maintaining an output diameter of the pulsed laser beam and a second operation for changing an output diameter of the pulsed laser beam.

9. The laser apparatus of claim 8, wherein the laser apparatus constantly maintains a diameter of the pulsed laser beam when the pulsed laser beam reaches a target.

10. The laser apparatus of claim 9, wherein the laser apparatus constantly maintains a diameter of the pulsed laser beam when the pulsed laser beam reaches the target by changing an output diameter of the pulsed laser beam if a distance from the target is changed.

11. The laser apparatus of claim 9, further comprising a lens unit for changing an output diameter of the pulsed laser beam.

12. The laser apparatus of claim 11, further comprising a distance recognition unit for recognizing a distance from the target, wherein the lens unit is controlled based on distance information recognized by the distance recognition unit.

13. The laser apparatus of claim 12, wherein the distance recognition unit measures the distance using ultrasonic waves, infrared rays, or a laser.

* * * * *